United States Patent
Xu et al.

(10) Patent No.: US 12,282,738 B2
(45) Date of Patent: Apr. 22, 2025

(54) NATURAL LANGUAGE PROCESSING TO EXTRACT SKILLS CHARACTERIZATION

(71) Applicant: SAP SE, Walldorf (DE)

(72) Inventors: Lei Xu, Shanghai (CN); Deng Feng Wan, Shanghai (CN)

(73) Assignee: SAP SE, Walldorf (DE)

( * ) Notice: Subject to any disclaimer, the term of this patent is extended or adjusted under 35 U.S.C. 154(b) by 346 days.

(21) Appl. No.: 17/735,525

(22) Filed: May 3, 2022

(65) Prior Publication Data

US 2023/0359820 A1    Nov. 9, 2023

(51) Int. Cl.
| | |
|---|---|
| *G06F 40/00* | (2020.01) |
| *G06F 40/166* | (2020.01) |
| *G06F 40/279* | (2020.01) |
| *G06Q 10/0631* | (2023.01) |

(52) U.S. Cl.
CPC .......... *G06F 40/279* (2020.01); *G06F 40/166* (2020.01); *G06Q 10/063112* (2013.01)

(58) Field of Classification Search
CPC .... G06F 40/279; G06F 40/166; G06F 40/284; G06F 40/30; G06Q 10/063112
See application file for complete search history.

(56) References Cited

U.S. PATENT DOCUMENTS

| | | | |
|---|---|---|---|
| 2021/0103775 A1* | 4/2021 | Glass | G06F 40/284 |
| 2022/0043972 A1* | 2/2022 | Nishida | G06F 40/20 |
| 2022/0188521 A1* | 6/2022 | Mu | G06F 40/295 |

OTHER PUBLICATIONS

Zhang, Mike, et al. "SkillSpan: Hard and soft skill extraction from English job postings." arXiv preprint arXiv:2204.12811 (Apr. 27, 2022), pp. 1-23 (Year: 2022).*
Joshi, Mandar, et al. "Spanbert: Improving pre-training by representing and predicting spans." Transactions of the association for computational linguistics 8 (2020), pp. 64-77 (Year: 2020).*
Chernova, Mariia, "Occupational Skills Extraction with FinBERT", Masters Thesis, available at https://www.theseus.fi/handle/10024/348657, (2020). (Year: 2020).*

* cited by examiner

*Primary Examiner* — Douglas Godbold
*Assistant Examiner* — Parker Mayfield
(74) *Attorney, Agent, or Firm* — SCHWEGMAN LUNDBERG & WOESSNER, P.A.

(57) ABSTRACT

Various examples are directed to systems and methods for characterizing natural language text units. A plurality of text units may be used to train a bidirectional model. A bidirectional model may be applied to a set of annotated text units to generate a plurality of span context vectors. The plurality of span context vectors may be used to train a span prediction model. The span prediction model may be applied to at least a portion of the plurality of text units to generate a plurality of span characterizations, a first span characterization corresponding to a first span indicating that the first span describes a first job skill.

20 Claims, 11 Drawing Sheets

NATURAL LANGUAGE PROCESSING TO EXTRACT SKILLS CHARACTERIZATION

BACKGROUND

Natural Language Processing (NLP) is associated with translating between natural human language and various computer-readable formatting. NLP presents various challenges, for example, due to differences between natural human language and information formatted for computing systems.

BRIEF DESCRIPTION OF DRAWINGS

The present disclosure is illustrated by way of example and not limitation in the following figures.

DETAILED DESCRIPTION

Figure 1:
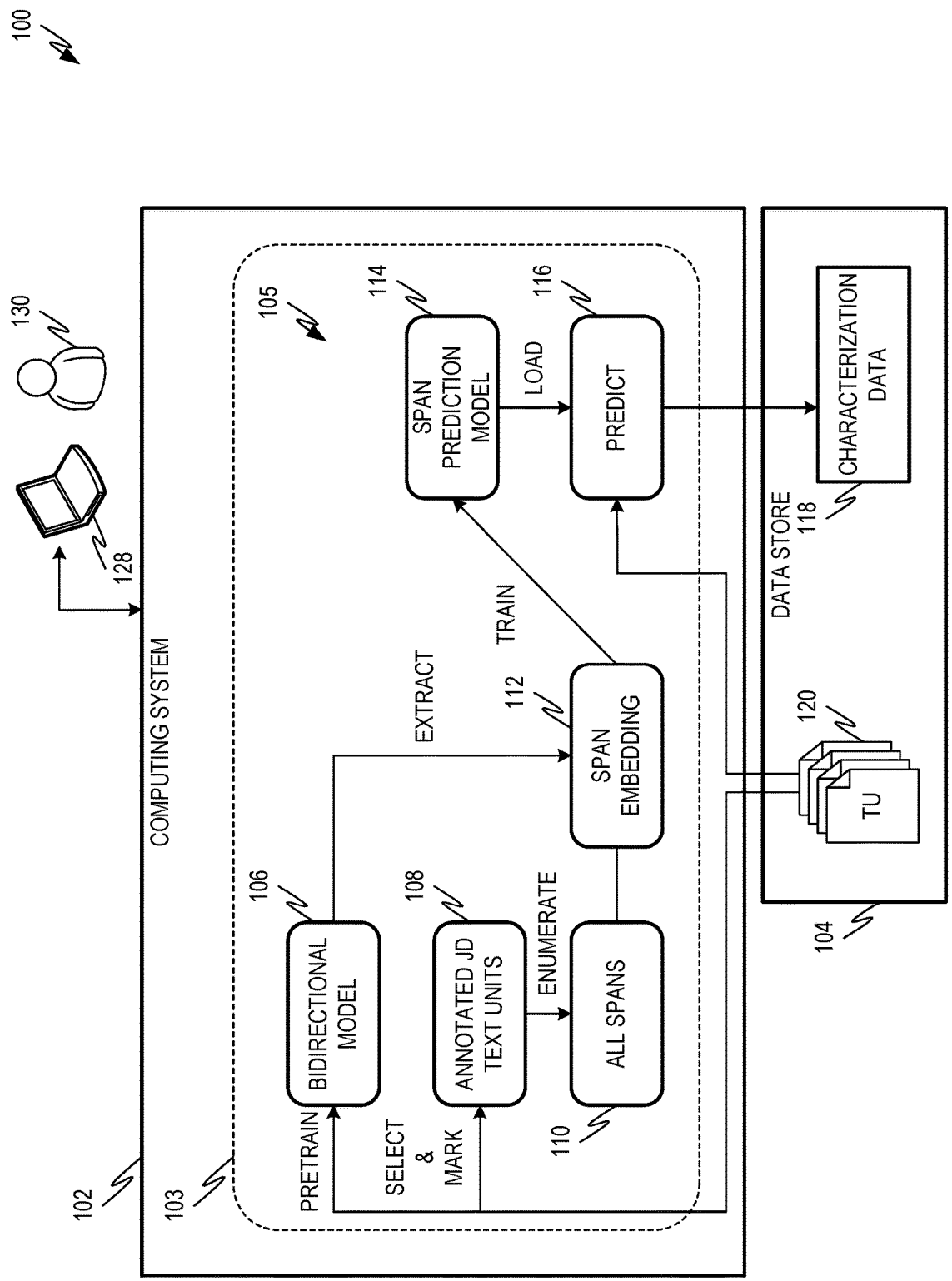
FIG. 1 is diagram showing one example of an environment for using a computing system to characterize job description text units from a corpus of job description text units.

Human capital management (HCM) software applications are used by various enterprises to harness the advantages of computing systems in managing human resources, such as employees, contractors, and the like. HCM applications can utilize the speed and efficiency of computing systems to perform various tasks such as, for example, payroll management, productivity management, recruiting management, and the like.

HCM and/or other similar software applications often utilize job descriptions. Job descriptions are descriptions of jobs or positions within the enterprise including, for example, a set of skills that are necessary and/or desired to adequately perform the job. The HCM or other application may utilize job descriptions to perform tasks such as, for example, matching candidates to open positions, evaluating the fit of existing employees or contractors to their current positions, and/or the like. An HCM application may analyze job descriptions using various different techniques including, for example, knowledge graphs. A knowledge graph describing job descriptions in an enterprise may have various nodes representing positions, hard skills, and soft skills. Edges in the knowledge graph may describe the relationships between the various positions and skills. The knowledge graph may be used by the HCM or other application to match candidates to open positions, evaluate the fit of existing employees or contractors to their current positions, and/or the like. The HCM or other application may utilize the knowledge graph to relate employees, contractors, and/or candidates to different positions based on hard skills and soft skills.

Generating a knowledge graph, and/or other uses of job descriptions by an HCM application, may involve NLP, such as translating natural human language to a format that can be comprehended by the computing system executing the HCM or other application. Job descriptions, for example, may be generated by a human user in a natural language format that describes hard skills and soft skills that are desirable and/or necessary for performing the described job. Hard skills may include quantifiable skills or candidate attributes such as, for example, a particular type and level of education, a particular type and duration of experience, a particular type of licensing, and the like. Soft skills, on the other hand, may include skills that are not as easily quantifiable such as, for example, communication skills, teamwork, adaptability, problem solving, leadership, time management, and the like.

Because hard skills may be more quantifiable, a computing system may be programmed to parse natural language job descriptions to identify hard skills using techniques such as keyword searches, data type searches, and the like. Extracting soft skills from natural language format job descriptions, however, may be more challenging. For example, job descriptions may not consistently use the same words or phrases to describe soft skills. Consider a soft skill such as "leadership." One job description may describe a position for an "experienced manager." Another may refer to "project lead experience." Both phrases may indicate the soft skill of leadership, albeit with different words and different language.

A lack of consistent terminology or phrasing used in job descriptions to describe various soft skills can present an obstacle to expanding HCM applications to effectively use job description data. For example, an HCM application that cannot accurately extract soft skill requirements from a job description may fail to build accurate knowledge graphs and/or fail to accurately perform job description-related tasks.

These and other challenges are addressed using a machine learning arrangement including a bidirectional model and a trained span prediction model. The bidirectional model may be trained to embed spans from job description text units, where a span is an ordered sequence of words from a job description text unit. The bidirectional model may embed a span by generating a context vector corresponding to the span. The context vector may comprise a set of numbers that describe the meaning of the words in the span considering the words of the span and/or surrounding words.

When trained, the bidirectional model may be applied to a set of annotated text units, which may be from the corpus. The annotated text units may include text units including spans and annotation data describing a job skill or job skills associated with the spans. The resulting context vectors may be used to train the span prediction model. The span prediction model may be applied to all or part of the corpus of job description text units to generate span characterizations for spans in the job description text unit. The span characterizations may indicate job skills, such as soft skills, indicated by the various job description text units.

In this way, a computing system may extract job skill data from a corpus of job description text units with minimal or no human labor. This may allow the computing device to utilize job description data, such as for a knowledge graph, in an HCM application and/or the like, with increased accuracy while minimizing and/or eliminating the need for expensive human labor. In this way, the HCM application, or other application, may quickly and accurately detect soft skills associated with various job descriptions, allowing the computing system to perform tasks that may have been previously performed manually.

FIG. 1 is diagram showing one example of an environment 100 for using a computing system 102 to characterize job description text units from a corpus 120 of job description text units. The environment 100 comprises a computing system 102 and a data store 104. The computing system 102 may be or include any suitable computing device or systems. In some examples, the computing system 102 is or includes a cloud deployment. For example, the computing system 102 may be executed by one or more server computing devices at a common geographic location and/or distributed across multiple geographic locations. In other examples, the computing system 102 is implemented in an on-premise arrangement including one or more server computing systems. For example, in an on-premise arrangement, the computing system 102 may include one or more server computing devices built and/or maintained by an entity associated with users of the computing system 102.

The data store 104 may be or include a database or other suitable data storage component in communication with the computing system 102. The data store 104 may comprise a single storage device at a single geographic location and/or may utilize multiple storage devices at a single geographic location and/or distributed across multiple geographic locations. The data store 104 may store the corpus 120 of job description text units. In some examples, the data store 104 also stores characterization data describing job skills, such as soft skills, indicated by the various job description text units.

The corpus 120 may include job description text units gathered from various sources. A text unit may be a natural language expression comprising an ordered set of words. A job description text unit may be a text unit that describes a job or position that is filled or is to be filled by a human, such as an employee or contractor. The corpus 120 may be generated in any suitable manner. In some examples, the corpus 120 is generated by accessing websites or other locations maintained by recruiting companies or any other locations where enterprises seeking help tend to post job description text units.

The job description text units of the corpus 120 may be enumerated into various spans. A span may be an ordered subset of one or more words from a text unit. For example, a span may include ordered permutations of the words in a text unit that are less than or equal to a given maximum span length. Consider an example job description text unit containing the following sequence of words:

Has strong problem analysis ability.

For a maximum span length of three, the following spans may be enumerated from the sequence above:

has
has strong
has strong problem
strong
strong problem
strong problem analysis
problem
problem analysis
problem analysis ability
analysis
analysis ability
ability The computing system 102 executes a job description characterization application 103 that may characterize job description text units from the corpus 120, as described herein. The job description characterization application 103 may be a stand-alone application and/or may be a component of an HCM application or other application. The job description characterization application 103 may execute a workflow 105 to characterize job description text units.

The environment 100 of FIG. 1 also includes a user 130 that may access the computing system 102 via a user computing device 128. The computing system 102 may provide the user 130 with a user interface, for example, via the user computing device 128. The user interface may facilitate the provision of operating parameters and/or other instructions from the user 130 to the computing system 102. In various examples, the user interface may be used to provide results of the job description characterization application 103 to the user 130. Also, although one user 130 and one user computing device 128 are shown in FIG. 1, it will be appreciated that the computing system 102 and job description characterization application 103 may support multiple users and multiple user computing devices.

The job description characterization application 103 may pretrain a bidirectional model 106. The bidirectional model 106 may be a model configured to embed, or generate context vectors, for spans. The bidirectional model 106 may consider words both before and after a given word or span. In some examples, the bidirectional model 106 is or includes a Bidirectional Encoder Representations from Transformers (BERT) model. The bidirectional model 106 may be pretrained using some or all of the job description text units from the corpus 120.

In some examples, the bidirectional model 106 is trained, at least in part, by masking a portion (e.g., 10%, 15%, 20% or the like) of the words from the job description text units of the corpus 120 to generate masked text units. The masked text units may be provided to the bidirectional model 106 as training data. The bidirectional model 106 may predict the masked words and changes may be made to the bidirectional model 106 based on how accurately it predicts the masked words. In some examples, the bidirectional model 106 is trained, at least in part, by providing pairs of sequential word sets, such as sentences, to the bidirectional model 106. At least one of the sequential word sets is from a job description text unit of the corpus 120. The bidirectional model 106 may be arranged to predict whether the second sequential word set appears adjacent (e.g., before or after) the first sequential word set in the relevant job description text unit.

The job description characterization application 103 may access annotated job description text units 108 for use with the bidirectional model 106. The annotated job description text units 108 may be text units that include at least some spans that are described by annotation data. Annotation data may indicate a job skill, such as a soft skill, indicated by a span. In some examples, annotated job description text units 108 may be accessed from the data store 104 or other suitable data store. Also, in some examples, annotated job description text units 108 may be selected from the corpus 120 and manually marked, for example, by the user 130.

In some examples, the job description characterization application 103 randomly selects a portion of the job description text units from the corpus 120 such as, for example, 10%. The selected job description text units may be provided to the user 130, e.g., via the user computing device 128. The user 130 may identify one or more spans at the selected job description text units that indicate specific job skills, such as soft skills. The job description characterization application 103 may generate the annotated job description text units 108 by appending annotation data to the text units, where the annotation data describes one or more job skills indicated by one or more spans of the text unit. The annotation data may be generated by the user 130 and/or by another user to characterize the one or more spans.

In some examples, the job description characterization application 103 parses annotated job description text units 108 according to a BRAT or similar format. Consider the following example portion of a job description text unit:

Develop a sales strategy to achieve organizational sales goals and revenues. Has strong problem analysis and problem solving skills.

The user 130 may indicate that words 1-3 of the above text unit indicate a "leadership" soft skill, the words 13-14 of the above text unit indicate an "adaptability" soft skill and that words 16-17 of the above text unit indicate a "problem solving" job skill. Annotation data for the above text unit in an example BRAT format may be rendered as shown:

"span_posLabel":{
"1; 3": "LEAD",
"13; 14": "ADAP",
"16; 17": "PROB"
}

In this example, LEAD may indicate the "leadership" soft skill, ADAP may indicate the "adaptability" soft skill, and PROB may indicate the "problem solving" soft skill. Other example soft skills may include "communication," which may be indicated as COMM, "teamwork," which may be indicated as TEAM, and "time management," which may be indicated by TIME. It will be appreciated that these are not the only soft skills or the only combination of soft skills that may be predicted by the job description characterization application 103.

The job description characterization application 103 may enumerate the annotated job description text units 108 to generate all spans 110 from the annotated job description text units 108. For example, the user 130 or other source may annotate spans that indicate a particular job skill. Not all spans, however, may be annotated. Accordingly, the job description characterization application 103 may parse the annotated job description text units 108 to extract all spans in a text unit, including annotated spans that correspond to a job skill and unannotated spans that do not correspond to any particular job skill.

The job description characterization application 103 may apply the trained bidirectional model 106 to the spans of the annotated job description text units 108 to generate span embeddings 112. In some examples, prior to applying the bidirectional model 106 to the spans, the job description characterization application 103 may encode each word in the respective spans as a unique number. The encoding, in some examples, may include adding special characters to the spans. Special characters may include a start of sentence character and an end of sentence character. In some examples, the special characters may also include pad characters that may be added to some or all of the spans, for example, to give all spans the same length in words. Also, an unknown character may be used to represent words that are known to be present but are otherwise unknown.

The bidirectional model 106 may be applied to the spans 110 to generate span embedding 112. The span embedding 112 may include span context vectors describing the respective spans 110. In some examples, described in more detail herein, the bidirectional model 106 may be arranged to apply self-attention to the span embedding 112. This may further correlate the span context vectors to surrounding words and/or spans.

The span embedding 112, including the span context vectors and the corresponding annotation data, may be used to train the span prediction model 114. The span prediction model 114, in some examples, is a multi-classification model and may be implemented using a softmax function. The span prediction model 114 can be trained in any suitable manner. In an example in which the span prediction model 114 is or includes a softmax model, it may be trained to do multi-classification using cross entropy loss as a loss function. Backward propagation may be used to update the model parameters for a determined number of epochs (e.g., 100 epochs) and/or until the model converges.

At operation 116, the job description characterization application 103 may load the span prediction model 114 and the job description text units from the corpus 120 (e.g., those that were not previously annotated) to generate characterization data 118. The characterization data 118 may indicate one or more job skills (e.g., soft skills) indicated by the various job description text units of the corpus 120. The characterization data 118 may be stored at the data store 104 and/or provided to the user 130 via the user computing device 128. The characterization data 118 may include characterizations by job description text unit and/or by span.

Figure 2:
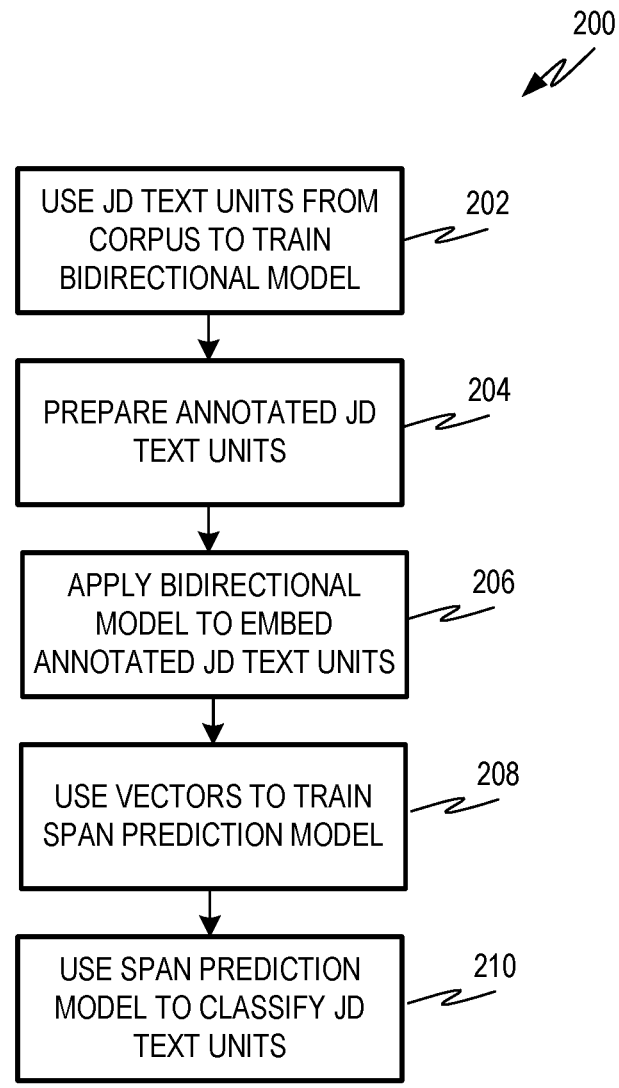
FIG. 2 is a flowchart showing one example of a process flow that may be executed by the job description characterization application to generate characterization data describing job skills indicated by job description text units.

FIG. 2 is a flowchart showing one example of a process flow 200 that may be executed by the job description characterization application 103 to generate characterization data 118 describing job skills indicated by job description text units. At operation 202, the job description characterization application 103 uses job description text units from the corpus 120 to train the bidirectional model 106. Additional examples describing training of the bidirectional model 106 are described herein, for example, above and at FIGS. 6-7. At operation 204, the job description characterization application 103 accesses annotated job description text units 108. At operation 206, the job description characterization application 103 applies the bidirectional model 106 to spans of the annotated job description text units 108 to generate span context vectors. In some examples, this may include prompting the user 130 to provide annotations indicating job skills requested by some or all of the job description text units of the corpus 120. For example, the job description characterization application 103 may be configured to provide one or more job description text units to the user 130 and prompt the user 130 to indicate one or more job skills indicated by the job description text units. In other examples, the job description characterization application

103 may access annotated job description text units that have been prepared by another party or component.

At operation 208, the span context vectors are used to train the span prediction model 114. At operation 210, the span prediction model 114 is applied to one or more job description text units (e.g., job description text units of the corpus 120) to generate corresponding characterization data.

Figure 3:
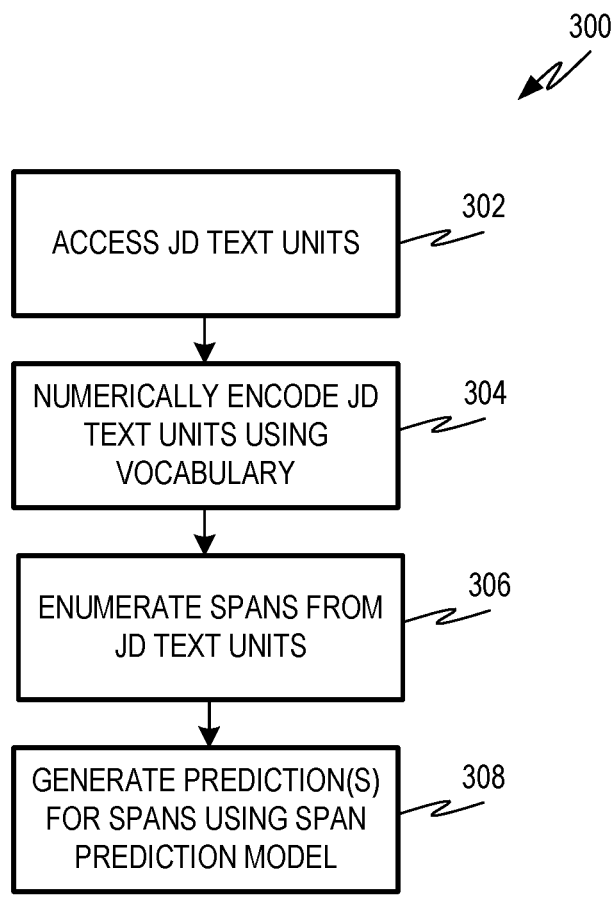
FIG. 3 is a flowchart showing one example of a process flow that may be executed by the job description characterization application to generate characterization data for one or more job description text units.

FIG. 3 is a flowchart showing one example of a process flow 300 that may be executed by the job description characterization application 103 to generate characterization data for one or more job description text units. For example, the process flow 300 shows one example way that the job description characterization application 103 may execute the operation 116 and/or the operation 210 described herein. For example, the process flow 300 may be executed by the job description characterization application 103 after the span prediction model 114 is trained, as described herein.

At operation 302, the job description characterization application 103 may access one or more job description text units. The job description text units, for example may be part of the corpus 120 and may be accessed from the data store 104. In some examples, the user 130 may provide the one or more job description text units, for example, with a request that the provided job description text units be characterized for indicated job skills, such as soft skills. In some examples, the job description text units may be provided by or indicated by an HCM application, for example, as part of generating a knowledge graph or other similar task.

At operation 304, the job description characterization application 103 may numerically encode the job description text unit or units according to a numerical vocabulary. The numerical vocabulary may indicate numbers that correspond to various words. Consider the example vocabulary segment below:

valley 1211
organization 1212
stop 1213
onto 1214
countries 1215
parts 1216
conference 1217
queen 1218
security 1219

In this example, the word "valley" corresponds to the number 1211. The word "organization" corresponds to the number 1212, and so on.

At operation 306, the job description characterization application 103 may enumerate spans from the considered job description text units. That may include, for example, determining the spans in any given job description text unit. Spans may be expressed as words and/or as numbers according to the vocabulary applied at operation 304.

At operation 308, the job description characterization application 103 applies the span prediction model 114 to the job description text units to generate characterization data 118 for the text units. For example, the span prediction model 114 may receive as input the various spans of the job description text units, for example, encoded according to the numerical vocabulary. As output, the span prediction model 114 may generate, for each span, at least one probability that the span indicates a category of job skill (e.g., soft skill). In some examples, the span prediction model 114 may generate more than one probability for a given span. For example, the span may have an X % probability of indicating a first job skill and a Y % probability of indicating a second job skill. In cases where more than one probability is returned for a span, the job description characterization application 103 may select the highest probability and characterize the span as indicating the job skill indicated by the highest probability. In an example, some spans may not indicate any job skills. These spans may not be characterized or may be characterized as not indicating any job skills.

Figure 4:
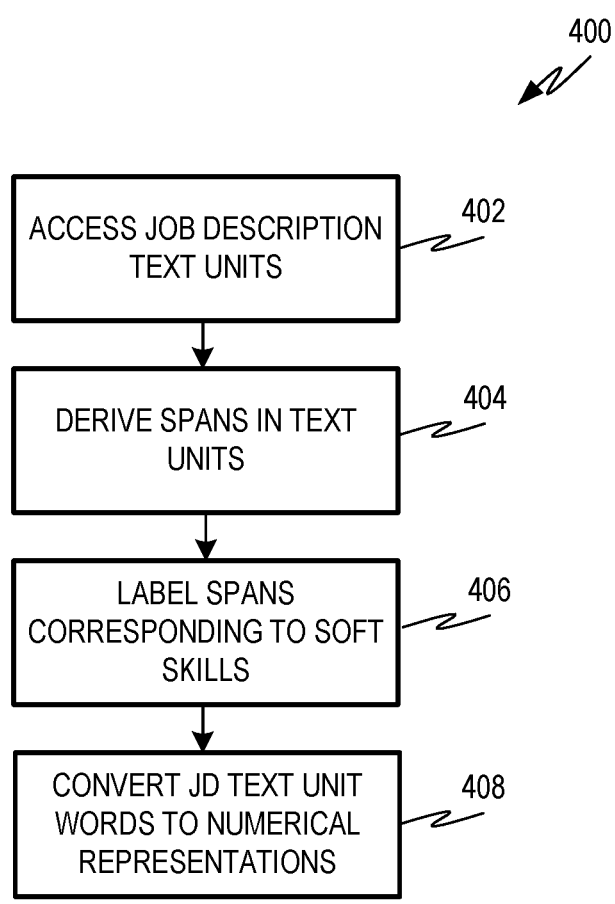
FIG. 4 is a flowchart showing one example of a process flow that may be executed by the job description characterization application to generate annotated text units.

FIG. 4 is a flowchart showing one example of a process flow 400 that may be executed by the job description characterization application 103 to generate annotated job description text units 108. For example, the process flow 400 may be executed examples in which the job description characterization application 103 (or another suitable component) generates the annotated job description text units 108.

At operation 402, the job description characterization application 103 may access job description text units to be annotated. For example, the job description characterization application 103 may access a portion of the job description text units at the corpus 120. The job description characterization application 103 may select a portion (e.g., 5%, 10%, 15%, 20%, and/or the like) of the corpus 120 utilizing a random and/or pseudorandom function. In another example, the job description characterization application 103 may receive job description text units from the user 130 and/or from another function or module of a HCM application.

At operation 404, the job description characterization application 103 enumerates spans in the accessed job description text units. For each job description text unit that may include, for example, working out the permutations of words in the job description text unit that can make up a span, for example, according to a maximum span length. The maximum span length may be any suitable length such as, for example, three words, two words, four words, and the like.

At operation 406, the job description characterization application 103 may label the spans with annotation data. The annotation data for a given span may indicate the job skill (if any) that is described by that span. The annotation may be provided, for example, by the user 130. The job description characterization application 103, for example, may add the annotation data to the spans to generate annotated job description text units. At operation 408, the job description characterization application 103 may generate numerical representations of the job description text units, for example, according to a vocabulary, as described herein. Spans generated at operation 404 may also be expressed numerically according to the vocabulary. Accordingly, an annotated job description text unit may include an indication of one or more spans from the text unit, which may be expressed numerically, and annotation data describing one or more job skills associated with the respective spans.

Figure 5:
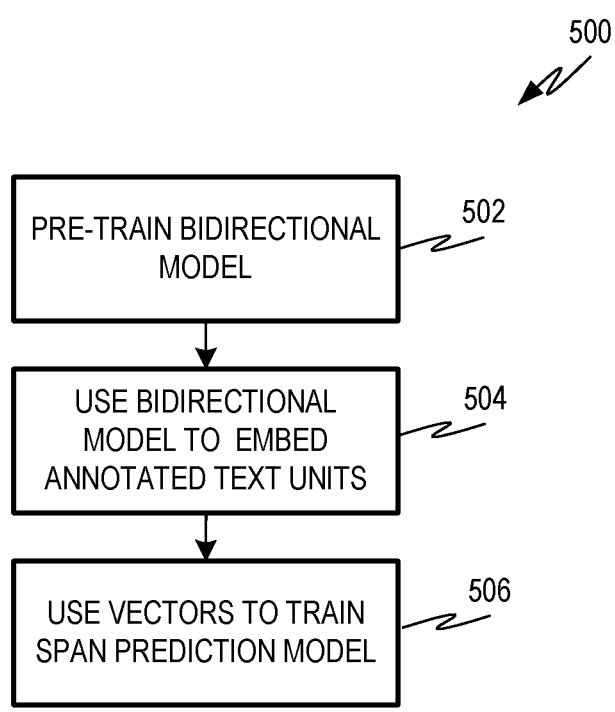
FIG. 5 is a flowchart showing one example of a process flow that may be executed by the job description characterization application to train the span prediction model.

FIG. 5 is a flowchart showing one example of a process flow 500 that may be executed by the job description characterization application 103 to train the span prediction model 114. At operation 502, the job description characterization application 103 may pretrain the bidirectional model 106. In some examples, the bidirectional model 106 may be pretrained using the corpus 120 of job description text units. The bidirectional model 106 may be trained, for example, to recognize the context of the job description text units making up the corpus 120. In some examples, the bidirectional model 106 may be trained by masking a portion of the words of the job description text units and training the bidirectional model 106 to predict the masked words. This technique is described in more detail with respect to FIG. 6. In some examples, in addition or instead, the bidirectional model 106 may be trained by providing two sentences (e.g., sequential string sets) selected from the corpus 120. The bidirectional model 106 may be trained to determine whether the second sentence is positioned adjacent to the first sentence in one of the job description text units of the corpus. This technique is described in more detail with respect to FIG. 7. A first sentence may be positioned adjacent to a second sentence, for example, if the first sentence is immediately before or immediately after the second sentence. Other units, such as words, word sets, and/or the like may be adjacent one another in the same manner.

At operation 504, the job description characterization application 103 may utilize the trained bidirectional model 106 to embed the annotated job description text units 108 (e.g., the spans thereof). The result may be a vector corresponding to each span of the annotated job description text units 108. In some examples, applying the bidirectional model 106 to embed the annotated job description text units includes applying a self-attention to the various spans. Further examples of applying the bidirectional model 106 to generate span context vectors are described herein including at FIGS. 8 and 9.

At operation 506, the job description characterization application 103 utilizes the span context vectors of the annotated job description text units to train the span prediction model 114. The output of the span prediction model 114 may be one or more class probabilities. Each class probability may indicate a probability that a span indicates a particular job skill (e.g., soft skill). In some examples, a softmax function may be used to implement the span prediction model 114, as given by Equation [1] below:

$$P = \frac{\text{score }(s_i, y)}{\Sigma_{y' \in y}\text{score }(s_i, y')} \quad [1]$$

In Equation [1], P is the probability that a given span describes a particular job skill. The value $s_i$ is the vector context function describing the given span. The value y is the true span category and the value y' indicates predicated span categories.

In some examples, the span prediction model 114 may include a softmax function, such as the one given in Equation [1] for each job skill that may be described by a span. Applying the span prediction model 114 to a job description text unit may include applying each softmax equation to the spans of the job description text unit. The result of applying a first softmax equation to the span may provide a probability that the span indicates a first job skill associated with the first softmax equation. Applying a second softmax equation to the span may provide a probability that the span indicates a second softmax equation, and so on. In examples in which the span prediction model 114 comprises one or more softmax functions, such as the softmax function indicated by Equation [1], the various softmax functions may be trained using cross entropy loss as the loss function. Backwards propagation may be used for a number of epochs (e.g., 100 epochs) and/or until the model converges.

Figure 6:
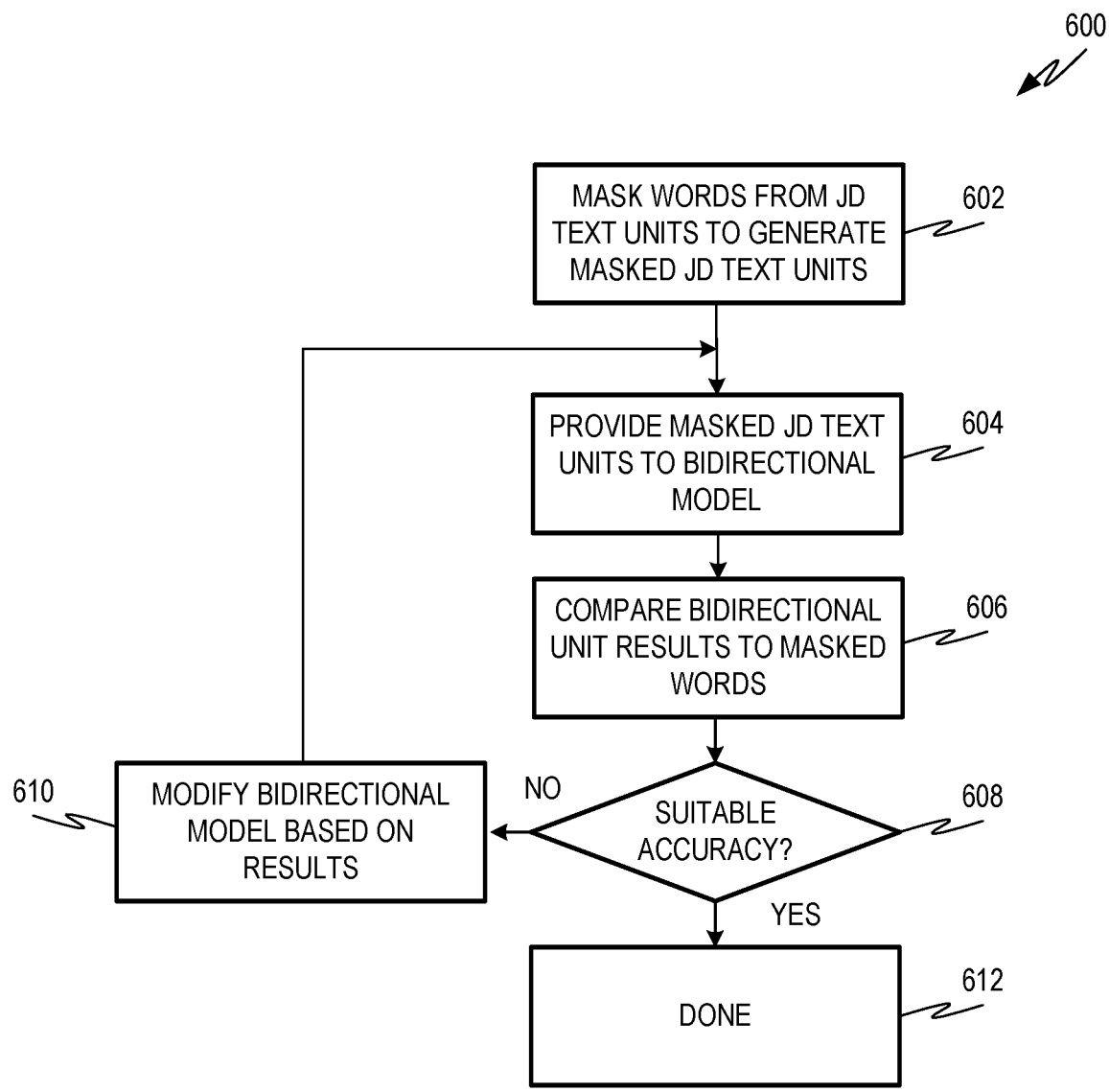
FIG. 6 is a flowchart showing one example of a process flow that may be executed by the job description characterization application to train the bidirectional model using the corpus.

FIG. 6 is a flowchart showing one example of a process flow 600 that may be executed by the job description characterization application 103 to train the bidirectional model using the corpus 120. At operation 602, the job description characterization application 103 preprocesses the job description text units of the corpus 120, for example, by masking a portion of the words in the text units. Masking a portion of the words in a text unit may include replacing a masked word with a mask token. Any suitable portion of the words of the job description text units may be masked such as, for example, 5%, 10%, 15%, 20%, 25%, and/or the like. The result of the masking may be a set of masked job description text units.

At operation 604, the job description characterization application 103 provides the masked job description text units to the bidirectional model 106. The bidirectional model 106 may be configured to detect the masked words from the various job description text units. For each masked word, the bidirectional model 106 generates a prediction of the value of the masked word in the original job description text unit. At operation 606, the job description characterization application 103 compares the predictions of the bidirectional model 106 to the values of the masked words in the original job description text units of the corpus 120.

At operation 608, the job description characterization application 103 determines if the accuracy of the bidirectional model 106 in predicting the masked words meets an accuracy threshold. If the accuracy threshold is met, the process may conclude at operation 612. If, on the other hand, the accuracy of the bidirectional model 106 does not meet the accuracy threshold, the job description characterization application 103 may modify the bidirectional model 106 based on the results at operation 610. This may include, for example, modifying coefficients or other factors of the bidirectional model 106 to make it more refine its performance for a next epoch of the training. The job description characterization application 103 may then return to operation 604 and provide the masked job description text units to the bidirectional model 106, as modified at operation 610. In some examples, instead of reusing the previously-generated masked job description text units, the job description characterization application 103 may return to operation 602 and generate new masked job description text units.

Figure 7:
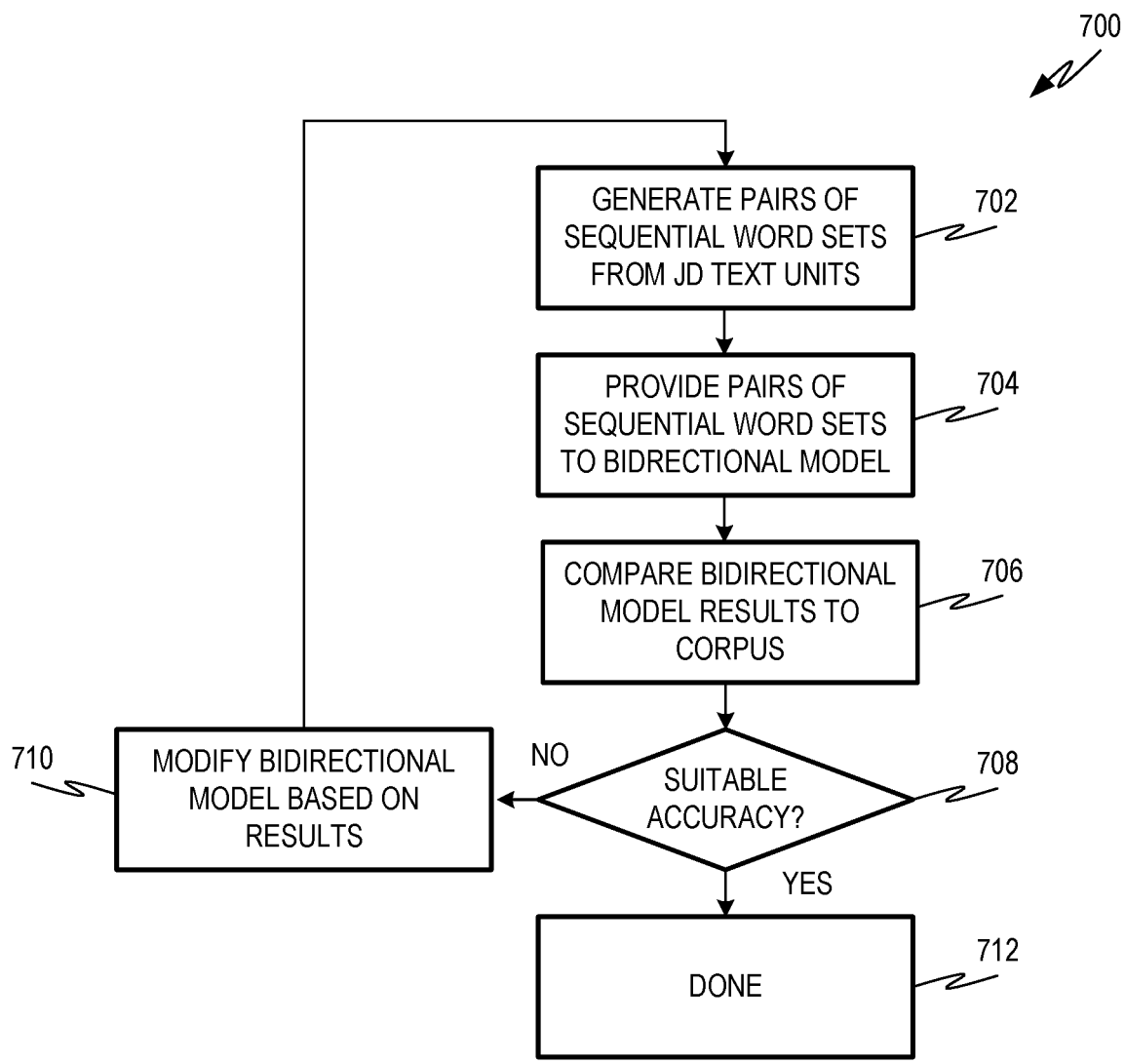
FIG. 7 is a flowchart showing one example of a process flow that may be executed by the job description characterization application to train the bidirectional model using the corpus.

FIG. 7 is a flowchart showing one example of a process flow 700 that may be executed by the job description characterization application 103 to train the bidirectional model using the corpus 120. At operation 702, the job description characterization application 103 may generate pairs of sequential word sets from the job description text units. The pairs of sequential word sets may include sentences, phrases, or other similar groupings of words from the job description text units of the corpus 120. Some of the pairs may be adjacent to one another in one or more of the job description text units. Other pairs may not be adjacent to one another in one of the job description text units of the corpus 120.

At operation 704, the job description characterization application 103 may provide the pairs of sequential word sets to the bidirectional model 106. The bidirectional model 106 may generate, for each pair of sequential word sets, a prediction of whether that pair of sequential word sets are adjacent to one another in a job description text unit of the corpus 120. At operation 706, the job description characterization application 103 may compare the results of the bidirectional model 106 to the corpus. The job description characterization application 103 may determine, for each pair of sequential word sets, whether the bidirectional model 106 correctly predicted whether the pair of sequential word sets were adjacent to one another in a job description text unit of the corpus 120.

At operation 708, the job description characterization application 103 determines the accuracy of the bidirectional model 106 in predicting whether the pairs of sequential word sets were adjacent to each other in a job description text unit of the corpus 120. If the accuracy threshold is met, the process may conclude at operation 712. If, on the other hand, the accuracy of the bidirectional model 106 does not meet the accuracy threshold, the job description characterization application 103 may modify the bidirectional model 106 based on the results at operation 710. This may include, for example, modifying coefficients or other factors of the bidirectional model 106 to make it more refine its performance for a next epoch of the training. The job description characterization application 103 may then return to operation 702 and generate new pairs of sequential word sets. In some examples, the job description characterization application 103 may use the previously-generated pairs of sequential word sets and return to operation 704 instead of operation 702.

Figure 8:
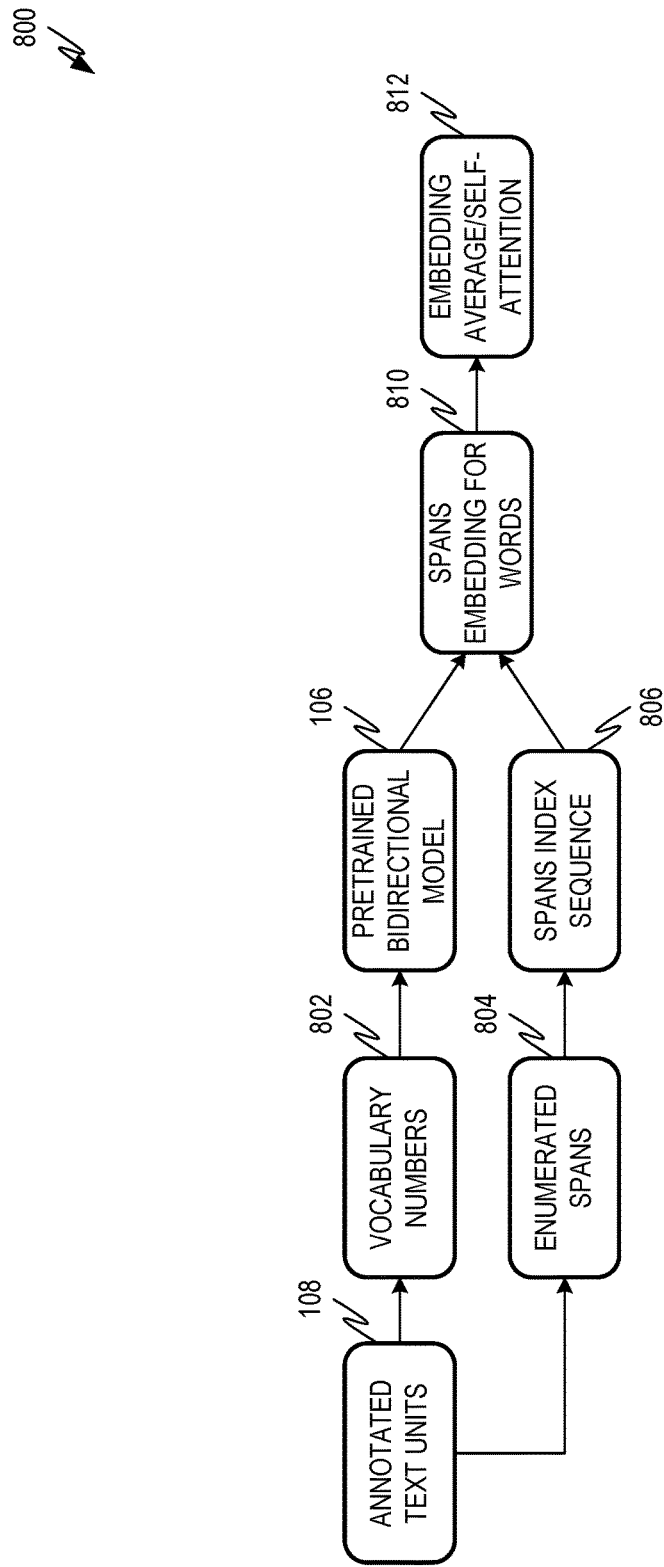
FIG. 8 is a diagram showing one example of a workflow that may be executed by the job description characterization application to generate span context vectors for the annotated job description text units.

FIG. 8 is a diagram showing one example of a workflow 800 that may be executed by the job description characterization application 103 to generate span context vectors for the annotated job description text units 108. Annotated job description text units 108 may be enumerated according to vocabulary numbers 802, as described herein. Also, in some examples, the job description characterization application 103 enumerates all annotated job description text units to generate enumerated spans 804 and determines a sequence of spans 806 in the various job description text units.

The enumerated text units are provided to the pretrained bidirectional model 106, which may generate span context vectors for each span of the enumerated text units. Consider an example job description text unit that, after being enumerated according to the vocabulary numbers 802, is expressed as "1218, 1213, 1099, 1200." The bidirectional model 106 may generate span embeddings 810 for various words in the annotated job description text units. The span embeddings 810 may have a size of [sequence length, embedding size]. In this example, the sequence length may be the max sequence length of the spans. The embedding size may be an integer that indicates the embedding size of each word (e.g., the length of the span context vector). The span embeddings 810 output by the bidirectional model 106 may provide a span context vector for each span of the enumerated spans 804. At operation 812, self-attention and/or averaging may be applied to the span embeddings 810, to generate context vectors for the various spans.

Figure 9:
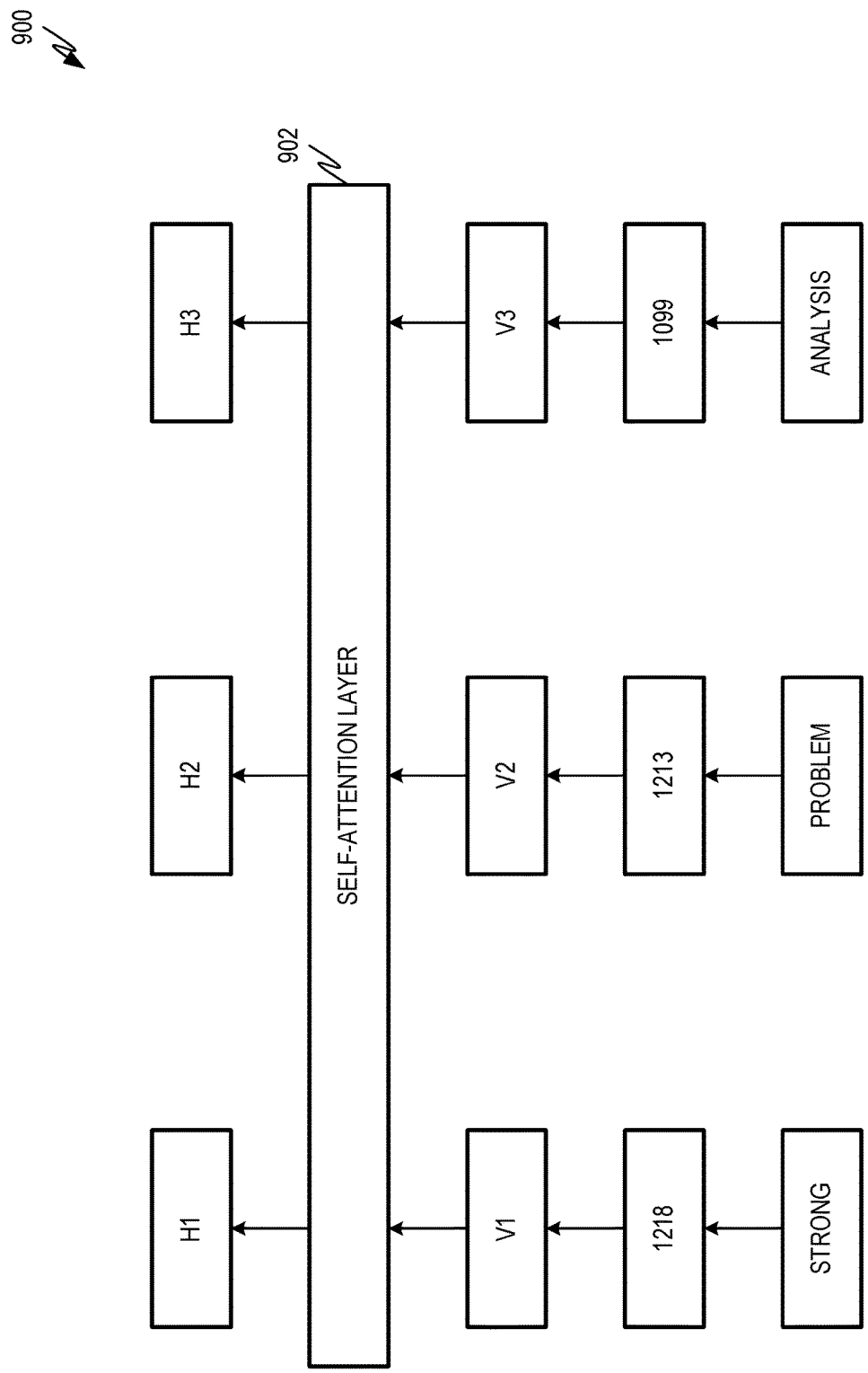
FIG. 9 is a diagram showing an example application of the bidirectional model including self-attention.

FIG. 9 is a diagram 900 showing an example application of the bidirectional model 106 including self-attention. In the example of FIG. 9, a span including three words is provided to the bidirectional model 106. The example span includes the words STRONG, PROBLEM, and ANALYSIS. A numerical vocabulary is applied to the words STRONG, PROBLEM, and ANALYSIS, resulting in the numbers 1218, 1213, and 1099. The numbers 1218, 1213, and 1099 are provided to the trained bidirectional model 106, resulting in the vector series $[V_1, V_2, V_3]$. In this example, $V_1$, $V_2$, and $V_3$ are word context vectors where $V_1$ corresponds to the word STRONG, $V_2$ corresponds to the word PROBLEM, and $V_3$ corresponds to the word ANALYSIS. In this example, a self-attention layer 902 is applied to the vector series $[V_1, V_2, V_3]$.

The self-attention layer 902 may obtain hidden output of the bidirectional model 106 to capture contextual information between each word of the span, resulting in a vector series $[H_1, H_2, H_3]$. In some examples, the span context vector may be obtained by averaging the vectors of the vector series $[H_1, H_2, H_3]$. Consider an example given by Equation [2] below:

$$Z = [H_1, H_2, \ldots, H_n] \quad [2]$$

In this example, the considered span has a length of n and Z is the vector series that is output of the self-attention layer 902. The job description characterization application 103 may determine the span context vector for the considered span by averaging the vector series Z, for example, as given by Equation [3] below:

$$avgZ = \frac{[H_1, H_2, \ldots, H_n]}{n} \quad [3]$$

In view of the disclosure above, various examples are set forth below. It should be noted that one or more features of an example, taken in isolation or combination, should be considered within the disclosure of this application.

Examples

Example 1 is a system for characterizing natural language text units, the system comprising: at least one processor programmed to perform operations comprising: using a plurality of text units to train a bidirectional model to generate context vectors, the plurality of text units indicating job descriptions; accessing a set of annotated text units from a corpus of text units describing job descriptions, a first annotated text unit of the set of annotated text units comprising: a first span comprising a first set of ordered words from the first annotated text unit; and first annotation data describing a job skill associated with the first span; applying the bidirectional model to the set of annotated text units to generate a plurality of span context vectors; using the plurality of span context vectors to train a span prediction model; and applying the span prediction model to at least a portion of the plurality of text units to generate a plurality of span characterizations, a first span characterization corresponding to a first span indicating that the first span describes a first job skill.

In Example 2, the subject matter of Example 1 optionally includes the training of the bidirectional model comprising: masking at least one word from a portion of the plurality of text units; predicting, using the bidirectional model, the at least one masked word; and modifying the bidirectional model based on the predicting.

In Example 3, the subject matter of any one or more of Examples 1-2 optionally includes the training of the bidirectional model comprising: accessing a first word sequence from a first text unit of the plurality of text units and a second word sequence; predicting, using the bidirectional model, whether the second word sequence follows the first word sequence in the first annotated text unit; and modifying the bidirectional model based on the predicting.

In Example 4, the subject matter of any one or more of Examples 1-3 optionally includes the bidirectional model being a Bidirectional Encoder Representations from Transforms (BERT) model.

In Example 5, the subject matter of any one or more of Examples 1-4 optionally includes the operations further comprising extracting the first span and a second span from the first annotated text unit, the plurality of span context vectors comprising a first span context vector describing the first span and a second span context vector describing the second span.

In Example 6, the subject matter of Example 5 optionally includes the plurality of span context vectors comprising a first span context vector describing the first span and a second span context vector describing the second span.

In Example 7, the subject matter of Example 6 optionally includes the first span context vector being based at least in part on the first span and the second span.

In Example 8, the subject matter of any one or more of Examples 1-7 optionally includes the operations further comprising enumerating the portion of the plurality of text units before applying the span prediction model.

Example 9 is a method of characterizing natural language text units, the method comprising: using a plurality of text units to train a bidirectional model to generate context vectors, the plurality of text units indicating job descriptions; accessing a set of annotated text units from a corpus of text units describing job descriptions, a first annotated text unit of the set of annotated text units comprising: a first span comprising a first set of ordered words from the first annotated text unit; and first annotation data describing a job skill associated with the first span; applying the bidirectional model to the set of annotated text units to generate a plurality of span context vectors; using the plurality of span context vectors to train a span prediction model; and applying the span prediction model to at least a portion of the plurality of text units to generate a plurality of span characterizations, a first span characterization corresponding to a first span indicating that the first span describes a first job skill.

In Example 10, the subject matter of Example 9 optionally includes the training of the bidirectional model comprising: masking at least one word from a portion of the plurality of text units; predicting, using the bidirectional model, the at least one masked word; and modifying the bidirectional model based on the predicting.

In Example 11, the subject matter of any one or more of Examples 9-10 optionally includes the training of the bidirectional model comprising: accessing a first word sequence from a first text unit of the plurality of text units and a second word sequence; predicting, using the bidirectional model, whether the second word sequence follows the first word sequence in the first annotated text unit; and modifying the bidirectional model based on the predicting.

In Example 12, the subject matter of any one or more of Examples 9-11 optionally includes the bidirectional model being a Bidirectional Encoder Representations from Transforms (BERT) model.

In Example 13, the subject matter of any one or more of Examples 9-12 optionally includes extracting the first span and a second span from the first annotated text unit, the plurality of span context vectors comprising a first span context vector describing the first span and a second span context vector describing the second span.

In Example 14, the subject matter of Example 13 optionally includes the plurality of span context vectors comprising a first span context vector describing the first span and a second span context vector describing the second span.

In Example 15, the subject matter of Example 14 optionally includes the first span context vector being based at least in part on the first span and the second span.

In Example 16, the subject matter of any one or more of Examples 9-15 optionally includes enumerating the portion of the plurality of text units before applying the span prediction model.

Example 17 is a non-transitory machine-readable medium comprising instructions thereon that, when executed by at least one processor, causes the at least one processor to perform operations comprising: using a plurality of text units to train a bidirectional model to generate context vectors, the plurality of text units indicating job descriptions; accessing a set of annotated text units from a corpus of text units describing job descriptions, a first annotated text unit of the set of annotated text units comprising: a first span comprising a first set of ordered words from the first annotated text unit; and first annotation data describing a job skill associated with the first span; applying the bidirectional model to the set of annotated text units to generate a plurality of span context vectors; using the plurality of span context vectors to train a span prediction model; and applying the span prediction model to at least a portion of the plurality of text units to generate a plurality of span characterizations, a first span characterization corresponding to a first span indicating that the first span describes a first job skill.

In Example 18, the subject matter of Example 17 optionally includes the training of the bidirectional model comprising: masking at least one word from a portion of the plurality of text units; predicting, using the bidirectional model, the at least one masked word; and modifying the bidirectional model based on the predicting.

In Example 19, the subject matter of any one or more of Examples 17-18 optionally includes the training of the bidirectional model comprising: accessing a first word sequence from a first text unit of the plurality of text units and a second word sequence; predicting, using the bidirectional model, whether the second word sequence follows the first word sequence in the first annotated text unit; and modifying the bidirectional model based on the predicting.

In Example 20, the subject matter of any one or more of Examples 17-19 optionally includes the bidirectional model being a Bidirectional Encoder Representations from Transforms (BERT) model.

Figure 10:
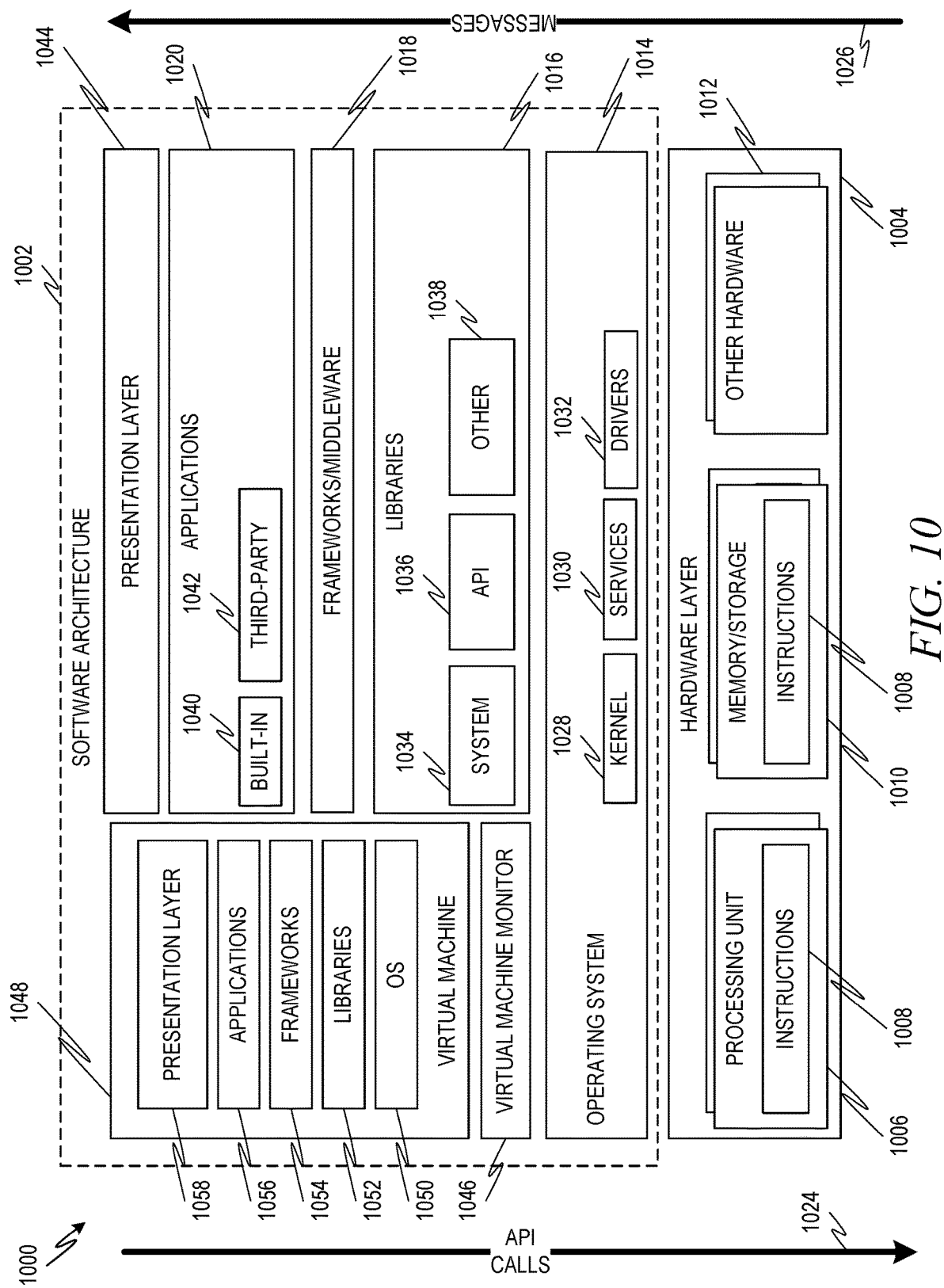
FIG. 10 is a block diagram showing one example of an architecture for a computing device.

FIG. 10 is a block diagram 1000 showing one example of an architecture 1002 for a computing device. The architecture 1002 may be used in conjunction with various hardware architectures, for example, as described herein. FIG. 10 is merely a non-limiting example of an architecture and many other architectures may be implemented to facilitate the functionality described herein. An example hardware layer 1004 is illustrated and can represent, for example, any of the above referenced computing devices. In some examples, the hardware layer 1004 may be implemented according to the architecture of the computer system of FIG. 11.

The hardware layer 1004 comprises one or more processing units 1006 having associated executable instructions 1008. Executable instructions 1008 represent the executable instructions of the architecture 1002, including implementation of the methods, modules, subsystems, components, and so forth described herein and may also include memory and/or storage modules 1010, which also have executable instructions 1008. Hardware layer 1004 may also comprise other hardware as indicated by other hardware 1012 which represents any other hardware of the hardware layer 1004, such as the other hardware illustrated as part of the architecture 1002.

In the example architecture of FIG. 10, the architecture 1002 may be conceptualized as a stack of layers where each layer provides particular functionality. For example, the architecture 1002 may include layers such as an operating system 1014, libraries 1016, middleware layer 1018, applications 1020, and presentation layer 1044. Operationally, the applications 1020 and/or other components within the layers may invoke API calls 1024 through the software stack and access a response, returned values, and so forth illustrated as messages 1026 in response to the API calls 1024. The layers illustrated are representative in nature and not all software architectures have all layers. For example, some mobile or special purpose operating systems may not provide a middleware layer 1018, while others may provide such a layer. Other software architectures may include additional or different layers.

The operating system 1014 may manage hardware resources and provide common services. The operating system 1014 may include, for example, a kernel 1028, services 1030, and drivers 1032. The kernel 1028 may act as an abstraction layer between the hardware and the other software layers. For example, the kernel 1028 may be responsible for memory management, processor management (e.g., scheduling), component management, networking, security settings, and so on. The services 1030 may provide other common services for the other software layers. In some examples, the services 1030 include an interrupt service. The interrupt service may detect the receipt of an interrupt and, in response, cause the architecture 1002 to pause its current processing and execute an interrupt service routine (ISR) when an interrupt is accessed.

The drivers 1032 may be responsible for controlling or interfacing with the underlying hardware. For instance, the drivers 1032 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1016 may provide a common infrastructure that may be utilized by the applications 1020 and/or other components and/or layers. The libraries 1016 typically provide functionality that allows other software modules to perform tasks in an easier fashion than to interface directly with operating system 1014 functionality (e.g., kernel 1028, services 1030 and/or drivers 1032). The libraries 1016 may include system 1034 libraries (e.g., C standard library) that may provide functions such as memory allocation functions, string manipulation functions, mathematic functions, and the like. In addition, the libraries 1016 may include API libraries 1036 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1016 may also include a wide variety of other libraries 1038 to provide many other APIs to the applications 1020 and other software components/modules.

The middleware layer 1018 (also sometimes referred to as frameworks) may provide a higher-level common infrastructure that may be utilized by the applications 1020 and/or other software components/modules. For example, the middleware layer 1018 may provide various graphic user interface (GUI) functions, high-level resource management, high-level location services, and so forth. The middleware layer 1018 may provide a broad spectrum of other APIs that may be utilized by the applications 1020 and/or other software components/modules, some of which may be specific to a particular operating system or platform.

The applications 1020 include built-in applications 1040 and/or third-party applications 1042. Examples of built-in applications 1040 may include, but are not limited to, a contacts application, a browser application, a book reader application, a location application, a median application, a messaging application, and/or a game application. Third-party applications 1042 may include any of the built-in applications 1040 as well as a broad assortment of other applications. In a specific example, the third-party application 1042 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1042 may invoke the API calls 1024 provided by the mobile operating system such as operating system 1014 to facilitate functionality described herein.

The applications 1020 may utilize built-in operating system functions (e.g., kernel 1028, services 1030, and/or drivers 1032), libraries (e.g., system 1034, API libraries 1036, and other libraries 1038), and middleware layer 1018 to create user interfaces to interact with users of the system. Alternatively, or additionally, in some systems interactions with a user may occur through a presentation layer, such as presentation layer 1044. In these systems, the application/module "logic" can be separated from the aspects of the application/module that interact with a user.

Some software architectures utilize virtual machines. In the example of FIG. 10, this is illustrated by virtual machine 1048. A virtual machine creates a software environment where applications/modules can execute as if they were executing on a hardware computing device. A virtual machine is hosted by a host operating system (operating system 1014) and typically, although not always, has a virtual machine monitor 1046, which manages the operation of the virtual machine 1048 as well as the interface with the host operating system (i.e., operating system 1014). An architecture executes within the virtual machine such as an operating system 1050, libraries 1052, frameworks/middleware 1054, applications 1056 and/or presentation layer 1058. These layers of architecture executing within the virtual machine 1048 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 11:
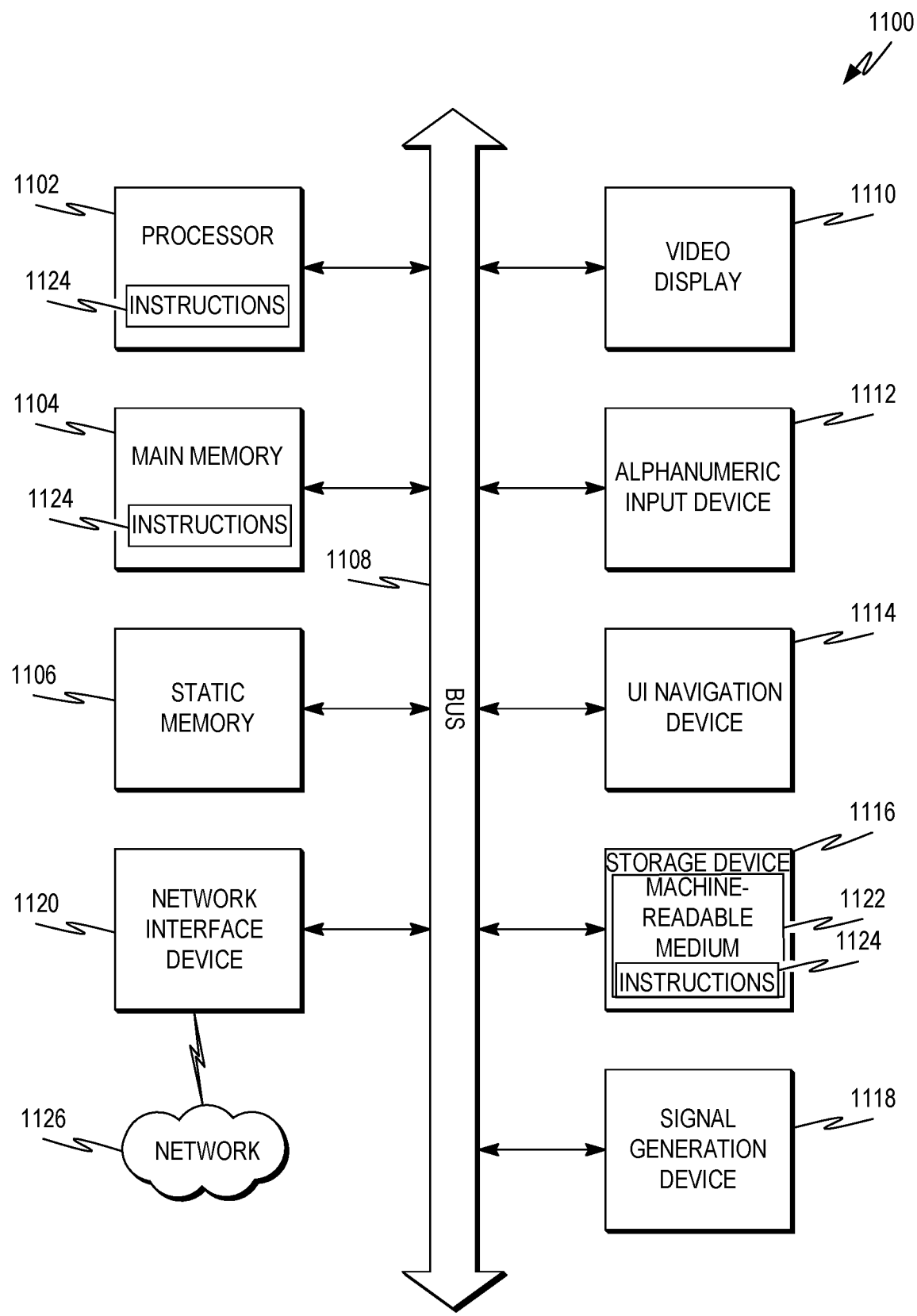
FIG. 11 is a block diagram of a machine in the example form of a computer system within which instructions may be executed for causing the machine to perform any one or more of the methodologies discussed herein.

FIG. 11 is a block diagram of a machine in the example form of a computer system 1100 within which instructions 1124 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU), or both), a main memory 1104, and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard or a touch-sensitive display screen), a user interface (UI) navigation (or cursor control) device 1114 (e.g., a mouse), a disk drive unit 1116, a signal generation device 1118 (e.g., a speaker), and a network interface device 1120.

Machine-Readable Medium

The disk drive unit 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104 and/or within the processor 1102 during execution thereof by the computer system 1100, with the main memory 1104 and the processor 1102 also constituting machine-readable media.

While the machine-readable medium 1122 is shown in an example embodiment to be a single medium, the term "machine-readable medium" may include a single medium or multiple media (e.g., a centralized or distributed database, and/or associated caches and servers) that store the one or more instructions 1124 or data structures. The term "machine-readable medium" shall also be taken to include any tangible medium that is capable of storing, encoding, or carrying instructions 1124 for execution by the machine and that cause the machine to perform any one or more of the methodologies of the present disclosure, or that is capable of storing, encoding, or carrying data structures utilized by or associated with such instructions 1124. The term "machine-readable medium" shall accordingly be taken to include, but not be limited to, solid-state memories, and optical and magnetic media. Specific examples of machine-readable media, such as medium 1122 and the like include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1124 may further be transmitted or received over a communications network 1126 using a transmission medium. The instructions 1124 may be transmitted using the network interface device 1120 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1124 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system for characterizing natural language text units, the system comprising:
  at least one processor programmed to perform operations comprising:
    using a plurality of text units to train a bidirectional model to generate context vectors, the plurality of text units indicating job descriptions;
    accessing a set of annotated text units from a corpus of text units describing job descriptions, a first annotated text unit of the set of annotated text units comprising:
      a first span comprising a first set of ordered words from the first annotated text unit; and
      first annotation data describing a job skill associated with the first span;
    applying the bidirectional model to the set of annotated text units to generate a plurality of span context vectors;
    using the plurality of span context vectors generated with the bidirectional model to train a span prediction model, the span prediction model comprising a first probability function configured to provide a probability that a span prediction model input indicates a first job skill and a second probability function to provide a probability that the span prediction model input indicates a second job skill; and
    applying the span prediction model to at least a portion of the plurality of text units to generate a plurality of span characterizations, a first span characterization corresponding to a first span indicating that the first span describes the first job skill.

2. The system of claim 1, the training of the bidirectional model comprising:
    masking at least one word from a portion of the plurality of text units;
    predicting, using the bidirectional model, the at least one masked word; and
    modifying the bidirectional model based on the predicting.

3. The system of claim 1, the training of the bidirectional model comprising:
    accessing a first word sequence from a first text unit of the plurality of text units and a second word sequence;
    predicting, using the bidirectional model, whether the second word sequence follows the first word sequence in the first annotated text unit; and
    modifying the bidirectional model based on the predicting.

4. The system of claim 1, the bidirectional model being a Bidirectional Encoder Representations from Transforms (BERT) model.

5. The system of claim 1, the operations further comprising extracting the first span and a second span from the first annotated text unit.

6. The system of claim 5, the plurality of span context vectors comprising a first span context vector describing the first span and a second span context vector describing the second span.

7. The system of claim 6, the first span context vector being based at least in part on the first span and the second span.

8. The system of claim 1, the operations further comprising enumerating the portion of the plurality of text units before applying the span prediction model.

9. A method of characterizing natural language text units, the method comprising:
    using a plurality of text units to train a bidirectional model to generate context vectors, the plurality of text units indicating job descriptions;
    accessing a set of annotated text units from a corpus of text units describing job descriptions, a first annotated text unit of the set of annotated text units comprising:
        a first span comprising a first set of ordered words from the first annotated text unit; and
        first annotation data describing a job skill associated with the first span;
    applying the bidirectional model to the set of annotated text units to generate a plurality of span context vectors;
    using the plurality of span context vectors generated with the bidirectional model to train a span prediction model, the span prediction model comprising a first probability function configured to provide a probability that a span prediction model input indicates a first job skill and a second probability function to provide a probability that the span prediction model input indicates a second job skill; and
    applying the span prediction model to at least a portion of the plurality of text units to generate a plurality of span characterizations, a first span characterization corresponding to a first span indicating that the first span describes the first job skill.

10. The method of claim 9, the training of the bidirectional model comprising:
    masking at least one word from a portion of the plurality of text units;
    predicting, using the bidirectional model, the at least one masked word; and
    modifying the bidirectional model based on the predicting.

11. The method of claim 9, the training of the bidirectional model comprising:
    accessing a first word sequence from a first text unit of the plurality of text units and a second word sequence;
    predicting, using the bidirectional model, whether the second word sequence follows the first word sequence in the first annotated text unit; and
    modifying the bidirectional model based on the predicting.

12. The method of claim 9, the bidirectional model being a Bidirectional Encoder Representations from Transforms (BERT) model.

13. The method of claim 9, further comprising extracting the first span and a second span from the first annotated text unit.

14. The method of claim 13, the plurality of span context vectors comprising a first span context vector describing the first span and a second span context vector describing the second span.

15. The method of claim 14, the first span context vector being based at least in part on the first span and the second span.

16. The method of claim 9, further comprising enumerating the portion of the plurality of text units before applying the span prediction model.

17. A non-transitory machine-readable medium comprising instructions thereon that, when executed by at least one processor, causes the at least one processor to perform operations comprising:
    using a plurality of text units to train a bidirectional model to generate context vectors, the plurality of text units indicating job descriptions;
    accessing a set of annotated text units from a corpus of text units describing job descriptions, a first annotated text unit of the set of annotated text units comprising:
        a first span comprising a first set of ordered words from the first annotated text unit; and
        first annotation data describing a job skill associated with the first span;
    applying the bidirectional model to the set of annotated text units to generate a plurality of span context vectors;
    using the plurality of span context vectors generated with the bidirectional model to train a span prediction model, the span prediction model comprising a first probability function configured to provide a probability that a span prediction model input indicates a first job skill and a second probability function to provide a probability that the span prediction model input indicates a second job skill; and
    applying the span prediction model to at least a portion of the plurality of text units to generate a plurality of span characterizations, a first span characterization corresponding to a first span indicating that the first span describes the first job skill.

18. The medium of claim 17, the training of the bidirectional model comprising:
    masking at least one word from a portion of the plurality of text units;
    predicting, using the bidirectional model, the at least one masked word; and
    modifying the bidirectional model based on the predicting.

19. The medium of claim 17, the training of the bidirectional model comprising:

accessing a first word sequence from a first text unit of the plurality of text units and a second word sequence;

predicting, using the bidirectional model, whether the second word sequence follows the first word sequence in the first annotated text unit; and modifying the bidirectional model based on the predicting.

20. The medium of claim 17, the bidirectional model being a Bidirectional Encoder Representations from Transforms (BERT) model.

\* \* \* \* \*